United States Patent [19]

Hamisch, Jr.

[11] 4,283,832

[45] Aug. 18, 1981

[54] METHOD OF MAKING PRINT HEAD ASSEMBLY

[75] Inventor: Paul H. Hamisch, Jr., Franklin, Ohio

[73] Assignee: Monarch Marking Systems, Inc., Dayton, Ohio

[21] Appl. No.: 69,217

[22] Filed: Aug. 23, 1979

[51] Int. Cl.³ .............................................. B23P 11/00

[52] U.S. Cl. ....................................... 29/434; 29/469; 101/111

[58] Field of Search ................. 101/99, 105, 110, 111; 29/426, 469, 434, 464

[56] References Cited

U.S. PATENT DOCUMENTS

| | | | |
|---|---|---|---|
| 3,744,411 | 7/1973 | Becker | 101/111 |
| 3,796,152 | 3/1974 | Finke et al. | 101/105 X |
| 3,933,092 | 1/1976 | Kirby | 101/105 |
| 3,968,745 | 7/1976 | Hamisch | 101/111 |
| 4,050,370 | 9/1977 | Keefe | 101/111 |
| 4,090,442 | 5/1978 | Yazawa et al. | 101/111 |

*Primary Examiner*—Edward M. Coven
*Attorney, Agent, or Firm*—Joseph J. Grass

[57] ABSTRACT

There is disclosed a method of making a print head assembly and a print head assembly. The print head assembly is comprised of one or more subassemblies. Each subassembly is made up of relatively few parts including a mounting block having a concave mounting surface, a series of drive wheels supported at their outer peripheries on the mounting surface, and a series of printing bands with which the drive wheels are engaged. The subassemblies can be readily assembled on a fixture. Thereafter, each subassembly is oriented relative to side plates to make a print head assembly.

12 Claims, 7 Drawing Figures

FIG-6
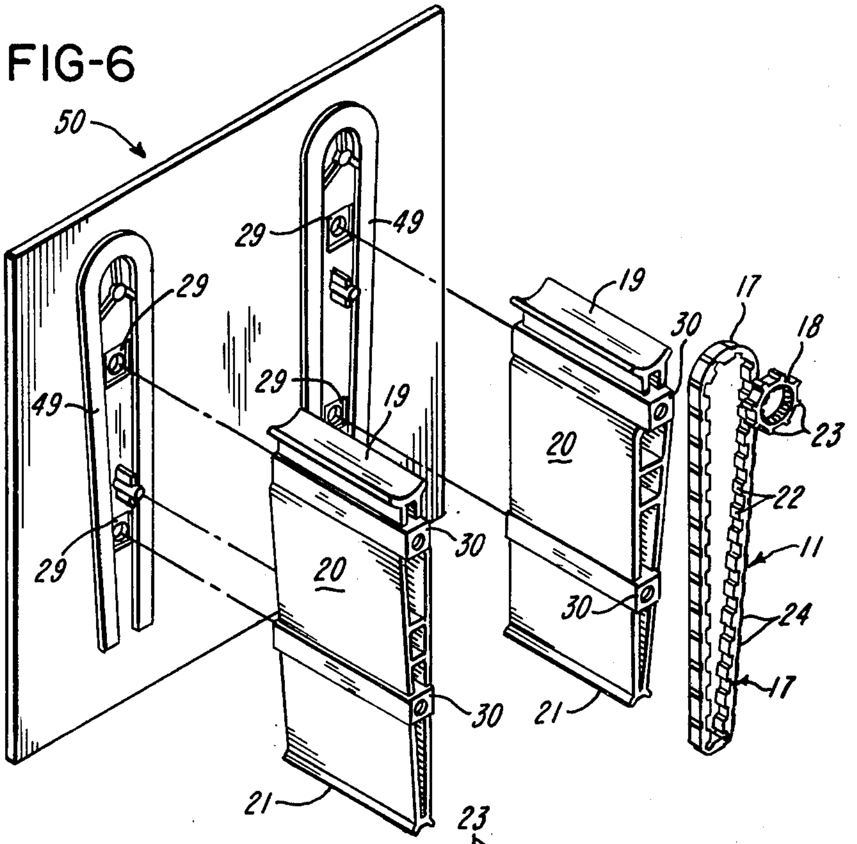
FIG-7
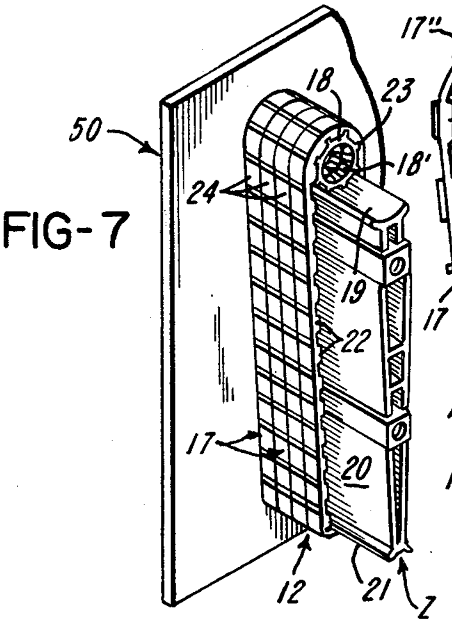
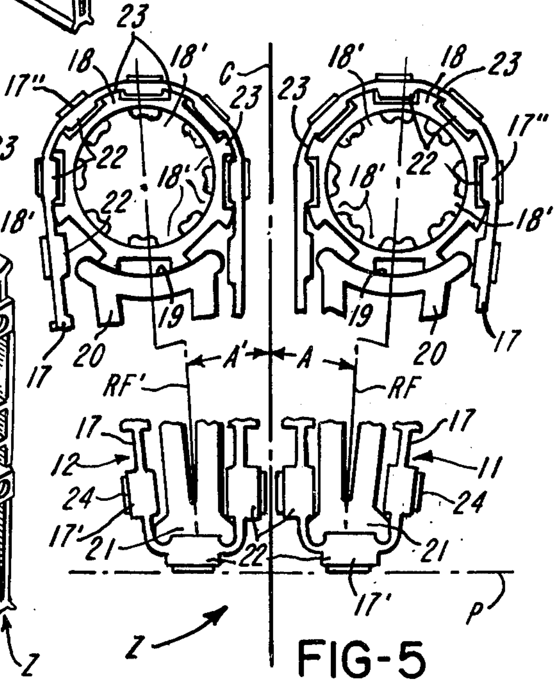
FIG-5

METHOD OF MAKING PRINT HEAD ASSEMBLY

BACKGROUND OF THE INVENTION

1. Field of the Invention

This invention relates to a method of making print head assemblies and to print head assemblies.

2. Brief Description of the Prior Art

Various embodiments of a prior art print head assembly are disclosed in U.S. Pat. No. 3,968,745 to Paul H. Hamisch, Jr. granted July 13, 1976. One embodiment has a single mounting block with a concave mounting surface for mounting drive wheels and support means. Printing bands are trained about the drive wheels and the support means. The mounting block is formed integrally with the support means and one side plate. There is a second side plate connected to the mounting block and a selector for engaging any drive wheel in its central hole to advance any selected printing band. The selector extends through an opening in the second side plate. The selector is assemblied onto the side plate before the second side plate is connected to the mounting block. In another embodiment suited for multi-line printing there are two such mounting blocks, two series of drive wheels and two series of printing bands and an integral side plate. There is a second side plate connected to the mounting blocks and there is a selector for each series of wheels. The print head assembly is assembled similarly to the manner described with respect to the previously mentioned embodiment.

In applicant's prior art print head assembly according to U.S. Pat. No. 3,968,745, one of the side plates is molded integrally with the mounting block and the parting line is taken along that side plate. This requires the mold for the mounting block and the integral support means to be provided with a certain draft angle from side-to-side to enable the resultant molded structure to be removed from the mold. Moreover, the molding of the side plate integrally with the mounting block and support means has at times caused the resultant structure to be warped.

The goal of high quality printing may not be achieved when the print head components are warped or when molding draft is other than negligible. High quality printing is required when printing machine readable codes such as the OCR code or various types of bar codes.

U.S. Pat. No. 3,796,152 to Eugene W. Finke and Paul H. Hamisch, Jr. granted Mar. 12, 1974 discloses a print head assembly having a mounting block with side plates. The side plates mount the shaft which in turn mounts the multisided side-by-side wheels.

SUMMARY OF THE INVENTION

The invention relates to a low cost, compact, modular, print head assembly having relatively few components, which components are readily accurately molded using moldable plastics material, and the molded components are easy to assemble.

In molding the mounting block of the present invention, the parting line is preferably midway between the sides so the draft angle is about one half as large as the draft angle for the mounting block in U.S. Pat. No. 3,968,745. Moreover, by molding the mounting block separate from the side plates, the mounting block is less likely to be warped. This is due mainly to the fact that the mounting block according to the present invention can be made of relatively uniform section without abrupt changes in section.

It is one feature of the invention to make the print head assembly by first assembling one or more subassemblies, each subassembly including a printing block having a concave mounting surface, drive wheels mounted at their outer peripheries on the concave mounting surface, supporting means, and printing bands trained about the drive wheels and the supporting means. The invention utilizes drive wheels having holes into which the selector extends. The wheels are preferably small so that the size of the print head can be small. It is preferred that the subassembly or subassemblies which form part of the print head assembly be assembled while the mounting block and support means are on a fixture. Thereafter the side plates and the selector assembled onto the subassembly or subassemblies. An important feature is that the subassembly be a modular unit which is easy-to-assemble and is easy-to-handle as a subassembly. It is preferred to have the supporting means integrally molded with the concave surface.

In making a print head assembly for printing two or more lines of data, it is preferred to have the lines close together without duplicating the number of parts. For example, a two-line print head assembly according to the invention can be made by orienting one print head subassembly in one way and orienting another identical print head subassembly the other way. This can be accomplished by having the supporting means of each subassembly close together and positioning the subassemblies at an angle with respect to each other while the supporting means support the lines of printing elements in a common plane. A line passing through the axis of the drive wheels and center of the supporting means intersects the plane at an angle with respect to the perpendicular. Each subassembly is inclined at the same angle with respect to a centerline perpendicular to the supporting plane, considering that the centerline passes between the subassemblies.

BRIEF DESCRIPTION OF THE DRAWINGS

FIG. 5 is a fragmentary diagrammatic view showing how the subassemblies are oriented;

FIG. 6 is an exploded perspective view showing how subassemblies can be assembled using a fixture; and FIG. 7 is a fragmentary perspective view of a subassembly assembled on the fixture.

DETAILED DESCRIPTION OF THE PREFERRED EMBODIMENT

Figure 1:
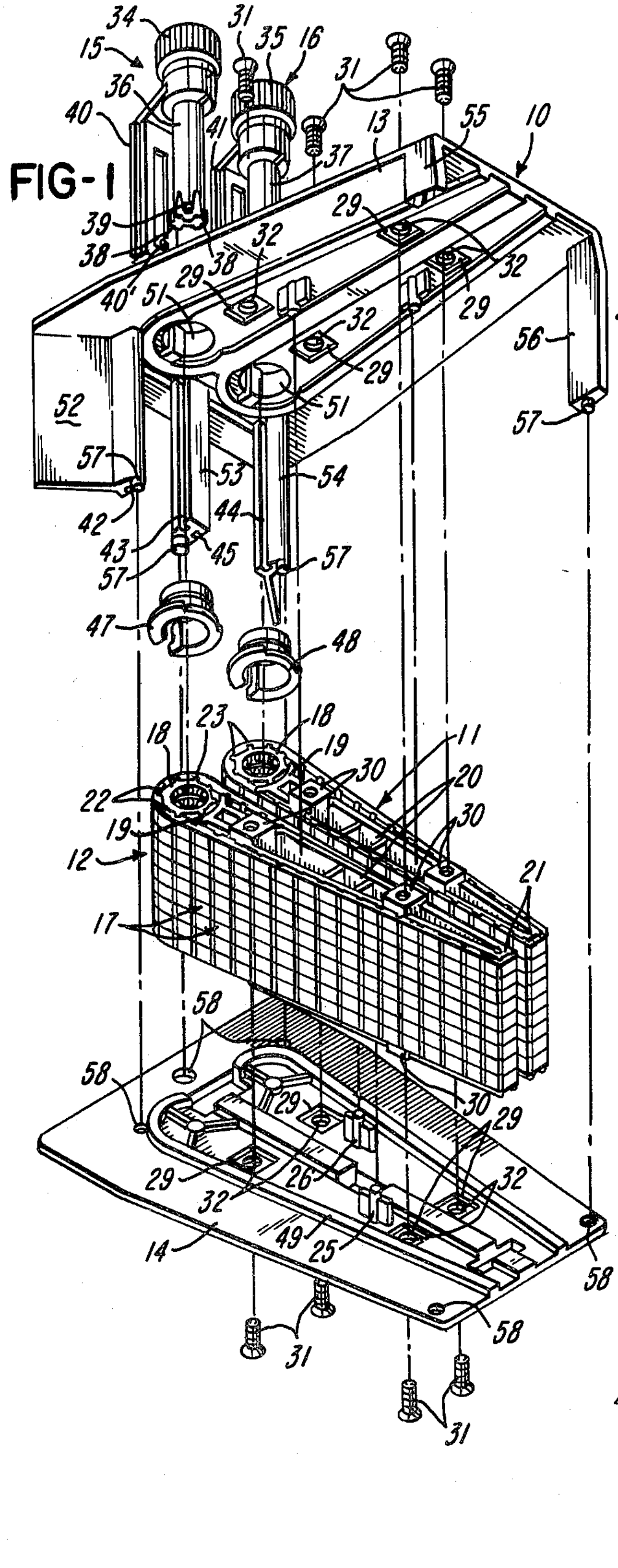
FIG. 1 is a partially exploded perspective view of a print head assembly in accordance with the invention.

With reference initially to FIG. 1, there is disclosed, in partially exploded form, a print head assembly generally indicated at 10. The assembly 10 is shown to include two subassemblies 11 and 12, side plates 13 and 14 and shiftable and rotatable selectors 15 and 16.

Figure 2:
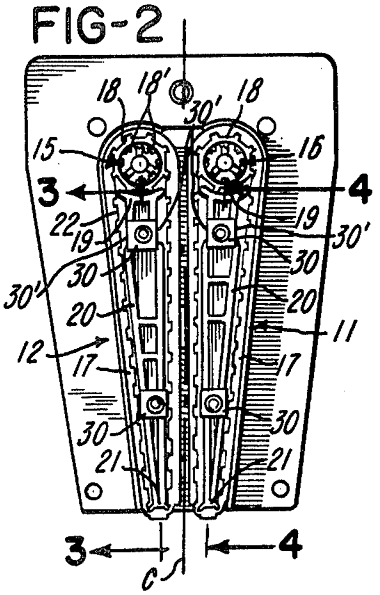
FIG. 2 is an end view showing two subassemblies and a side plate.
Figure 3:
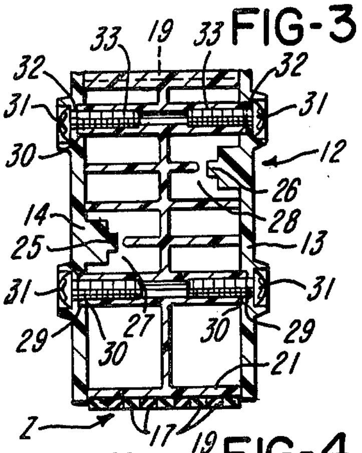
FIG. 3 is a sectional view taken along line 3—3 of FIG. 2.
Figure 4:
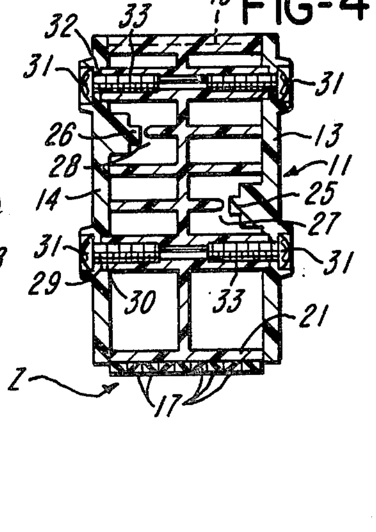
FIG. 4 is a sectional view taken along line 4—4 of FIG. 2.

Referring now also to FIGS. 2 through 4, the subassemblies 11 and 12 are shown to be identical, and hence the same reference characters will be used to denote like components. The subassemblies 11 and 12 have flexible printing bands 17 arranged to print a plurality of lines.

Each subassembly includes a series of printing bands arranged to print a single line. Each printing band has a printing portion 17' and a human readable portion 17". Each printing band 17 is engaged with a drive wheel 18 which is rotatably mounted or supported at its outer periphery on an arcuate concave mounting surface 19. The concave mounting surface 19 cradles the respective series of wheels 18. The mounting surface 19 is illustrated to be part of a mounting block 20. It is preferred that a support 21 be formed integrally as part of the mounting block as opposed to having separate idler wheels which are well known in the art so that manufacturing costs can be kept to a minimum. The printing bands 17 of each subassembly are trained about the respective wheels 18 and the support 21 and are under a slight amount of tension to insure good traction between lugs 22 on the underside of the printing band and lugs 23 at the outer peripheries of the wheels 18. The outer surfaces of the printing bands 17 are provided with a series of different printing elements 24 along the printing portion 17' for printing selected indicia on a record. As best shown in FIG. 5, the supports 21 each support a plurality of printingg elements 24 at a printing zone Z in a common flat plane P. The subassemblies 11 and 12 are shown to be disposed at predetermined angles so that the printing elements 24 are in fact in the common plane P and yet the subassemblies 11 and 12 are identical. This is accomplished by having the subassemblies 11 and 12 in reverse positions as best illustrated in FIGS. 3 and 4. It is readily apparent from these FIGURES that the integral mounting blocks 20 and their respective supports 21 are integral asymmetrical parts. The side plate 14 has a pair of projections or lugs 25 and 26 which are received in cavities 27 and 28. The projections 25 and 26 are offset from each other so that the subassembly 12 can be connected to the side plates 13 and 14 in only one position as is evident from FIG. 3 and the subassembly 11 can be connected to the side plates 13 and 14 only in the opposite position as indicated in FIG. 4.

The side plate 14 has a plurality of rectangular sockets or recesses 29 for receiving respective keys or locators 30. The side plate 13 also has a plurality of sockets or recesses 29 for receiving keys or locators 30. The recesses 29 and keys 30 fit precisely and accurately locate the side plate with respect to the integral mounting block 20 and the support 21 of each subassembly. Threaded fasteners 31 pass through holes 32 in the respective side plates 13 and 14 and are threadably received in holes 33 in the mounting block 20 to hold the subassemblies 11 and 12 and the side plates 13 and 14 accurately in assemblied relationship.

The selectors 15 and 16 have respective knobs 34 and 35 and respective selector shafts 36 and 37. Each selector shaft (only shaft 36 being shown in detail) has a plurality of lugs 38 for engaging in respective recesses 18' at the inner periphery of respective wheels 18. Further details of the selector are best shown in U.S. Pat. No. 3,968,745. Each selector 15 and 16 also includes a detent element 39 also best shown in U.S. Pat. No. 3,968,745. The detent element 39 releasably holds the respective selector in any selected position. Selectors 15 and 16 further include respective indicators 40 and 41 which are mounted for sliding movement by guides 42 and 43, and 44 and 45. The indicators 40 and 41 have pointers 40' are aligned with the lugs 38 to indicate the wheel 18 which is being engaged. Each selector 15 and 16 is provided with a respective retainer 47 and 48 for holding the selectors 15 and 16 assembled with the side plate 13.

With reference to FIG. 6, there is shown a fixture generally indicated at 50. It is apparent that the fixture 50 is similar to the structure of the side plate 14 except that the sockets 29 and the spacers 49 associated with each subassembly are spaced relatively widely apart. This wide spacing as shown in FIG. 6 facilitates assembly of the wheels 18 and printing bands 17 onto the mounting block 20 and the support 21 because there is adequate working space around each mounting block 20 and its support 21. The mounting blocks 20 are plugged into the fixture 50 as indicated. Thereafter, each wheel and its respective printing band 17 is mounted onto the respective mounting block. This is accomplished by placing the gear in mesh with several lugs 22, thereafter positioning one of the printing blocks at the printing zone Z as shown in FIG. 7 and thereafter manually tensioning the print band and sliding the wheel onto the concave mounting surface 19. The printing band 17 and its respective wheel 18 are manually pushed along until the printing bands and wheels are stacked in a series, a partial series being shown in FIG. 7. With the arrangement shown in FIGS. 6 and 7, the subassemblies 11 and 12 and the subassemblies 11 and 12 can be stacked or conveniently stored until ready to be assembled with the remaining components of the print head assembly. The construction of the subassemblies 11 and 12 is economically accomplished because the mounting blocks and the supports 21 are integral. Both subassemblies 11 and 12 are easy to handle and therefore with respect to this feature it is not necessary that the mounting block 20 and the support 21 be integral. With respect to this feature it is only necessary that once the wheels 18 and bands 17 have been assembled onto the mounting block 20 and the support 21 that the resultant unit be of a subassembly which can be easily handled to facilitate final assembly, and the subassemblies form important parts of the print head assembly. In the prior art device according to U.S. Pat. No. 3,796,152, where wheels are used, there is no easy-to-handle subassembly because the shaft for the idler wheels is not supported or mounted by the subassembly itself but rather by side plates.

It is another feature of the invention to provide means that render it impossible to assemble the modular subassemblies 11 and 12 incorrectly because the rectangular keys 30 have sides 30' that extend parallel to a centerline C and if the positions of the subassemblies 11 and 12 were interchanged, it would be readily apparent to the assembler that the supports 21 would be too far apart. As indicated in FIGS. 2 and 5, the supports are close together so that the lines of printing on the record will be close. Also, the projections 25 and 26 make misorientation of the subassemblies 11 and 12 impossible. As is evident, the axes of the two series of wheels 18 are more widely spaced apart than the supports 21. As illustrated, a reference line RF drawn through the axis of the wheels 18 and the center of the support 21 of subassembly 11 exists at an angle A with respect to the centerline C. Similarly, a reference line RF' drawn through the axis of the wheels 18 and the center of the support 21 of subassembly 12 makes an angle A' with the centerline C. The centerline C is perpendicular to the plane P and is disposed between the respective subassemblies 11 and 12. The angles A and A' are equal to each other so it is readily apparent that is it only necessary to reverse the positions of the subassemblies 11 and 12 in order to be able to assemble the subassemblies 11 and 12 properly with respect to the side plates 13 and 14.

In assembling the print head assembly 10, it is preferred to key the subassemblies 11 and 12 to the side plate 14 by means of the locators 30 extending into sockets 29 and thereupon pass the threaded fasteners 31 through holes 32 and into the mounting blocks 20. It is apparent that the side plate 14 is devoid of posts which would interfere with the connection of the subassemblies 11 and 12 and the side plate 14. Thereupon the selector shafts 36 and 37 are inserted through openings 51 in the side plate 13 and then retainers 47 and 48 are connected to the respective shafts 36 and 37 to hold the selectors 15 and 16 in assembled relationship with respect to side plate 13. The indicators 40 and 41 are inserted into guide relationship with respect to respective guides 42 and 43, and 44 and 45. The guides 42 through 45 are part of posts 52, 53 and 54 and there are additional posts 55 (only a fragment of which is shown) and 56. The posts 52 through 56 have respective keys or locators 57 received in respective sockets or holes 58. Once the selectors 15 and 16 have been assembled onto the side plate 13, the outer portion of the selector shafts 36 and 37 are inserted into the holes 18' in the wheels 18 and the locators 57 are inserted into the sockets 58. Thereupon the threaded fasteners 31 associated with the side plates 13 and 14 can be passed through respective holes 32 and into the mounting blocks 20.

Other embodiments and modifications of this invention will suggest themselves to those skilled in the art, and all such of these as come within the spirit of this invention are included within its scope as best defined by the appended claims.

I claim:

1. Method of making a print head assembly, comprising the steps of: providing mounting meanss having a concave mounting surface, providing supporting means disposed opposite the concave mounting surface, providing a series of drive wheels having holes, providing a series of printing bands each having a plurality of different printing elements, providing a selector, providing a pair of first and second side plates with the second side plate having an opening, placing the mounting means and supporting means in a fixture, assembling the drive wheels and the respective printing bands onto the mounting means so that the drive wheels are rotatably supported on the concave mounting surface with their holes in general alignment and with the printing bands being trained about the respective drive wheels and the supporting means to provide a subassembly, removing the subassembly from the fixture, and connecting the first and second side plates to opposite sides of the subassembly in precise orientation with the selector extending through the opening in the second side plate and into the holes to engage any selected wheel to provide an assembly.

2. Method of making a print head assembly, comprising the steps of: providing a pair of separate, molded mounting blocks composed of plastics material each having a substantially constant profile with an elongate concave mounting surface, there being means opposite the concave mounting surface for supporting printing bands, providing for each of the mounting blocks a series of drive wheels having central holes defining a continuous opening, providing a series of printing bands for each mounting block with each band having a plurality of different printing elements, providing a pair of band selectors, providing a pair of separate first and second molded side plates composed of plastics material with the second side plate having openings, assembling a series of drive wheels and a series of printing bands on each of the mounting blocks with the drive wheels rotatably supported on the concave mounting surface with the printing bands trained about the respective drive wheels and the band supporting means, providing a locator and a cooperating locator-receiving recess for the first side plate and for one side portion of each mounting block, locating the pair of mounting blocks in side-by-side, oriented relationship with respect to each other and with respect to the first side plate using the respective cooperating locators and locator-receiving recesses to present the printing elements at the band supporting means in a common plane, providing a locator and a cooperating locator-receiving recess for the second side plate and for the other side portion of each mounting block, each band selector being positioned in the continuous opening of the respective series of drive wheels with a portion of the band selector projecting through the respective opening in the second side plate, and locating the second side plate with respect to the pair of mounting blocks using the respective cooperating locators and locator-receiving recesses.

3. Method of making a print head assembly, comprising the steps of: providing a pair of separate, molded mounting blocks composd of plastics material each having a substantially constant profile with an elongate concave mounting surface, there being means opposite the concave mounting surface for supporting printing bands, providing for each of the mounting blocks a series of drive wheels having central holes defining a continuous opening, providing a series of printing bands for each mounting block with each band having a plurality of different printing elements, providing a pair of band selectors, providing a pair of separate first and second molded side plates composed of plastics material with the second side plate having openings, assemblying a series of drive wheels and a series of printing bands on each of the mounting blocks with the drive wheels rotatably supported on the concave mounting surface with the printing bands trained about the respective drive wheels and the band supporting means, providing a locator and a cooperating locator-receiving recess for the first side plate and for one side portion of each mounting block, locating the pair of mounting blocks in side-by-side, oriented relationship with respect to each other and with respect to the first side plate using the respective cooperating locators and locator-receiving recesses to present the printing elements at the band supporting means in a common plane, providing a locator and a cooperating locator-receiving recess for the second side plate and for the other side portion of at least one of the mounting blocks, each band selector being positioned in the continuous opening of the respective series of drive wheels with a portion of the band selector projecting through the respective opening in the second side plate, locating the second side plate with respect to the pair of mounting blocks using the respective cooperating locators and the locator-receiving recesses, and thereafter inserting securing means into each mounting block through the locators and the cooperating locator-receiving recesses associated with the first and second side plates for securing the first and second side plates and the mounting blocks in located relationship.

4. Method of making a print head assembly, comprising the steps of: providing a pair of separate, molded mounting blocks composed of plastics material each having a substantially constant profile with an elongate concave mounting surface, there being means opposite the concave mounting surface for supporting printing bands, providing for each of the mounting blocks a series of drive wheels having central holes defining a continuous opening, providing a series of printing bands for each mounting block with each band having a plurality of different printing elements, providing a pair of band selectors, providing a pair of separate first and second molded side plates composed of plastics material with the second side plate having openings, assembling a series of drive wheels and a series of printing bands on each of the mounting blocks with the drive wheels rotatably supported on the concave mounting surface with the printing bands trained about the respective drive wheels and the band supporting means, providing a locator and a cooperating locator-receiving recess for the first side plate and for one side portion of each mounting block, locating the pair of mounting blocks in side-by-side, oriented relationship with respect to each other and with respect to the first side plate using the respective cooperating locators and locator-receiving recesses to present the printing elements at the band supporting means in a common plane, providing a locator and a cooperating locator-receiving recess for the second side plate and for the other side portion of at least one of the mounting blocks, each band selector being positioned in the continuous opening of the respective series of drive wheels with a portion of the band selector projecting through the respective opening in the second side plate, locating the second side plate with respect to the pair of mounting blocks using the respective cooperating locators and the locator-receiving recesses, thereafter inserting securing means into each mounting block through the locator and the cooperating locator-receiving recesses associated with the first and second side plates for securing the first and second side plates and the mounting blocks in located relationship, wherein the inserting step includes the steps of passing a threaded fastener through one of the locators and its corresponding locator-receiving recess to secure the first side plate to one side portion of one of the mounting blocks and passing a threaded fastener through another one of the locators and its corresponding locator-receiving recess to secure the second side plate to the other side portion of one of the mounting blocks.

5. Method of making a print head assembly, comprising the steps of: providing a pair of separate and identical molded mounting blocks composed of plastics material with each mounting block having means providing a concave mounting surface, there being means opposite the concave surface providing a band support, providing for each of the mounting blocks a series of drive wheels having central holes defining a continuous opening, providing a series of printing bands for each mounting block with each band having a plurality of different printing elements, providing a pair of band selectors, providing a pair of first and second molded side plates composed of plastics material with the second side plate having openings, assembling a series of drive wheels and a series of printing bands on each of the mounting blocks with the drive wheels rotatably supported by the support surface and with the printing bands trained about the respective drive wheels and band support means, providing the mounting blocks and at least one side plate with cooperating means enabling the mounting blocks to be positioned in only opposite orientations with respect to each other, positioning the mounting blocks in opposite orientations with a centerline through one series of wheels and its respective band support means and another centerline through the other series of wheels and the other band support means being equally and oppositely angularly inclined with respect to a common intervening line perpendicular to a plane provided by the band support means with each band selector being positioned in the continuous opening of the respective series of drive wheels with a portion of the band selector projecting through the respective opening in the second side plate and with the first and second side plates secured to both mounting blocks for maintaining the positioned relationship of the mounting blocks and the first and second side plates relative to each other.

6. Method of making a print head assembly, comprising the steps of: providing a pair of mounting means each having a concave mounting surface, there being band supporting means disposed opposite each concave mounting surface, providing for each mounting means a series of drive wheels having holes, providing for each mounting means a series of printing bands each having a plurality of different printing elements, providing a pair of selectors, providing a pair of first and second side plates with the second side plate having openings, placing the pair of mounting means and supporting means in a fixture, assembling the drive wheels and the respective printing bands onto the mounting means so that the drive wheels are rotatably supported on the concave mounting surface with their holes in general alignment and with the printing bands being trained about the respective drive wheels and the supporting means to provide a pair of subassemblies, removing the subassemblies from the fixture, and connecting the first and second side plates to opposite sides of the subassembly in a predetermined orientation with the selectors extending through the openings in the second side plate and into the holes to engage any selected wheel to provide an assembly.

7. Method of making a print head assembly, comprising the steps of: providing a pair of separate and identical molded mounting blocks composed of plastics material with each mounting block having means providing a concave mounting surface, there being means opposite the mounting surface providing a band support, providing for each of the mounting blocks a series of drive wheels having central holes defining a continuous opening, providing a series of printing bands for each mounting block with each band having a plurality of different printing elements, providing a pair of band selectors, providing a pair of first and second molded side plates composed of plastics material with the second side plate having openings, assembling a series of drive wheels and a series of printing bands on each of the mounting blocks with the drive wheels rotatably supported on the mounting surface and with the printing bands trained about the respective drive wheels and band support means, positioning the mounting blocks in opposite orientations with a centerline through one series of wheels and its respective band support means and another centerline through the other series of wheels and its respective band support means being equally and oppositely angularly inclined with respect to a common intervening line perpendicular to a plane provided by the band support means, wherein the positioning step includes providing a locator and a cooperating locator-receiving recess for the first side plate and for one side portion of each mounting block, locating the pair of mounting blocks in side-by-side, oriented relationship with respect to each other and with respect to the first side plate using the cooperating locator and locator-receiving recesses to present the printing elements at the band supporting means in a common plane, and providing a locator and a cooperating locator-receiving recess for the second side plate and for the other side portion of at least one of the mounting blocks, locating the second side plate with respect to the mounting blocks, and securing the first and second side plates to the mounting blocks with the mounting blocks disposed in side-by-side oppositely oriented relationship with respect to each other with each band selector being positioned in the continuous opening of the respective series of drive wheels with a portion of the band selector projecting through the respective opening in the second side plate.

8. Method of making a print head assembly, comprising the steps of: providing a pair of separate molded mounting blocks composed of plastics material with each mounting block having means providing a concave support surface, there being means opposite the mounting surface providing a band support, providing for each of the mounting blocks a series of drive wheels having central holes defining a continuous opening, providing a series of printing bands for each mounting block with each band having a plurality of different printing elements, providing a pair of band selectors, providing a pair of first and second molded side plates composed of plastics material with the first side plate being devoid of structure that would interfere with the connection of the mounting blocks to the first side plate and with the second side plate having openings, assembling a series of drive wheels and a series of printing bands on each of the mounting blocks with the drive wheels rotatably supported on the mounting surface and with the printing bands trained about the respective drive wheels and band support means, and positioning the mounting blocks in opposite orientations with a centerline through one series of wheels and its respective band support means and another centerline through the other series of wheels and its respective band support means being equally and opposite angularly inclined with respect to a common intervening line perpendicular to a plane provided by the band support means, wherein the positioning step includes providing a locator and a cooperating locator-receiving recess for the first side plate and for one side portion of each mounting block, locating the pair of mounting blocks in side-by-side, oriented relationship with respect to each other and with respect to the first side plate using the cooperating locator and locator-receiving recesses to present the printing elements at the band supporting means in a common plane, and providing a locator and a cooperating locator-receiving recess for the second side plate and for the other side portion of at least one of the mounting blocks, and locating the second side plate with respect to the mounting blocks.

9. Method of making a print head assembly, comprising the steps of: providing a pair of separate mounting blocks composed of plastics material with each mounting block having means providing a concave mounting surface, there being means opposite the mounting surface providing a band support, providing for each of the mounting blocks a series of drive wheels having central holes defining a continuous opening, providing a series of printingg bands for each mounting block with each band having a plurality of different printing elements, providing a pair of band selectors, providing an indicator for each selector for indicating the selected printing band to which the selector is coupled, providing a pair of first and second molded side plates composed of plastics material with the second side plate having openings for the selectors and only the second side plate having laterally projecting guides for slidably mounting the indicators, assembling a series of drive wheels and a series of printing bands on each of the mounting blocks with the drive wheels rotatably supported on the mounting surface and with the printing bands trained about the respective drive wheels and band support means, positioning the mounting blocks in side-by-side spaced relationship with respect to each other using the first side plate, wherein said positioning step includes providing a locator and a cooperating locator-receiving recess for the first side plate and for one side portion of each mounting block, positioning the band selectors through the respective openings in the second side plate with the indicators in guided relationship with the guides, thereafter positioning the second side plate relative to the other side portions of the pair of mounting blocks with the band selectors extending into the respective continuous openings, and wherein said step of positioning the second side plate includes providing a locator and a cooperating locator-receiving recess for the second side plate and for the other side portion of at least one of the mounting blocks.

10. Method of making a print head assembly, comprising the steps of: providing a pair of separate, molded mounting blocks composed of plastics material each having means providing an elongate concave mounting surface, there being means opposite the mounting surface for supporting printing bands, providing for each of the mounting blocks a series of drive wheels having central holes defining a continuous opening, providing a series of printing bands for each mounting block with each band having a plurality of different printing elements, providing a pair of band selectors, providing a pair of first and second molded side plates composed of plastics material with the second side plate having openings, assemblying a series of drive wheels and a series of printing bands on each of the mounting blocks with the drive wheels rotatably supported on the concave mounting surface with the printing bands trained about the respective drive wheels and the band supporting means to provide a pair of subassemblies, thereafter locating the pair of subassemblies in side-by-side, oriented relationship with respect to each other and with respect to the first side plate using locators and cooperating locator-receiving recesses, with each band selector being positioned in the continuous opening of the respective series of drive wheels with a portion of the band selector projecting through the respective opening in the second side plate, and thereafter locating the second side plate with respect to the pair of mounting blocks to provide an assembly.

11. Method of making a print head assembly, comprising the steps of: providing a pair of separate, molded mounting blocks from plastics material each having means providing an elongate concave mounting surface, there being means opposite the mounting surface for supporting a printing band, providing for each of the mounting blocks a series of drive wheels having central holes defining a continuous opening, providing a series of printing bands for each mounting block with each band having a plurality of different printing elements, providing a pair of band selectors, providing a pair of first and second molded side plates composed of plastics material with the second side plate having openings, assembling a series of drive wheels and a series of printing bands on each of the mounting blocks with the drive wheels rotatably supported on the mounting surface with the printing bands trained about the respective drive wheels and the band supporting means to provide a pair of subassemblies, wherein the steps of providing the molded mounting blocks and the first and second molded side plates include providing cooperating first locator means for the first side plate and for one side portion of each mounting block and second locator means for the second side plate and for the other side portion of each mounting block, locating the pair of subassemblies in side-by-side, oriented relationship with respect to each other and with respect to the first side plate using the first locator means, with each band selector being positioned in the continuous opening of the respective series of drive wheels with a portion of the band selector projecting through the respective opening in the second side plate, and thereafter locating the second side plate with respect to the pair of mounting blocks using the second locator means.

12. Method of making a print head assembly, comprising the steps of: providing a pair of separate, molded one-piece mounting blocks from plastics material each having means providing an elongate, integral concave mounting surface and an integral band support surface disposed opposite the concave mounting surface for supporting printing bands, providing for each of the mounting blocks a series of drive wheels having central holes defining a continuous opening, providing a series of printing bands for each mounting block with each band having a plurality of different printing elements, providing a pair of band selectors, providing a pair of first and second molded side plates composed of plastics material with the second side plate having openings, assembling a series of drive wheels and a series of printing bands on each of the mounting blocks with the drive wheels rotatably supported on the concave support surface with the printing bands trained about the respective drive wheels and the band supporting means, wherein the steps of providing the molded mounting blocks and providing the first and second molded side plates include providing cooperating first locator means for the first side plate and for one side portion of each mountingg block and second locator means for the second side plate and for the other side portion of at least one mounting block, locating the pair of mounting blocks in side-by-side oriented relationship with respect to each other and with respect to the first side plate using the first locator means, each band selector being positioned in the continuous opening of the respective series of drive wheels with a portion of the band selector projecting through the respective opening in the second side plate, and thereafter locating the second side plate with respect to the pair of mounting blocks using the second locator means.

* * * * *

UNITED STATES PATENT AND TRADEMARK OFFICE

CERTIFICATE OF CORRECTION

PATENT NO. : 4,283,832

DATED : August 18, 1981

INVENTOR(S) : Paul H. Hamisch, Jr.

It is certified that error appears in the above-identified patent and that said Letters Patent are hereby corrected as shown below:

Column 5, line 36, "meanss" should be --means--. Column 6, line 27, "composd" should be --composed--. Column 12, line 18, "mountingg" should be --mounting--.

Signed and Sealed this

*Twenty-seventh* Day of *October 1981*

[SEAL]

*Attest:*

GERALD J. MOSSINGHOFF

*Attesting Officer* *Commissioner of Patents and Trademarks*